(12) United States Patent  (10) Patent No.: US 7,782,385 B2
Sasaki et al.  (45) Date of Patent: Aug. 24, 2010

(54) AF-AREA DISPLAY APPARATUS AND AF-AREA OPERATION APPARATUS

(75) Inventors: Tadashi Sasaki, Saitama (JP); Atsushi Kanayama, Saitama (JP); Kunio Yata, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 831 days.

(21) Appl. No.: 11/280,397

(22) Filed: Nov. 17, 2005

(65) Prior Publication Data
US 2006/0109371 A1 May 25, 2006

(30) Foreign Application Priority Data
Nov. 19, 2004 (JP) ............................. 2004-336297
Jan. 17, 2005 (JP) ............................. 2005-008914

(51) Int. Cl.
*H04N 5/222* (2006.01)
*H04N 5/232* (2006.01)
(52) U.S. Cl. .................... 348/333.02; 348/346
(58) Field of Classification Search ............ 348/333.01, 348/333.02, 333.04, 333.11, 345, 346
See application file for complete search history.

(56) References Cited
U.S. PATENT DOCUMENTS
4,812,912 A  3/1989  Iida et al.

| 6,683,652 | B1* | 1/2004 | Ohkawara et al. ............ 348/347 |
| 7,324,151 | B2* | 1/2008 | Onozawa ..................... 348/346 |
| 2003/0025802 | A1* | 2/2003 | Mayer et al. ........... 348/211.99 |
| 2003/0076429 | A1* | 4/2003 | Karasaki et al. .......... 348/240.2 |
| 2004/0165879 | A1 | 8/2004 | Sasaki et al. |
| 2005/0031325 | A1* | 2/2005 | Fujii .......................... 396/54 |
| 2005/0264680 | A1* | 12/2005 | Yajima ....................... 348/345 |

FOREIGN PATENT DOCUMENTS
| EP | 1 017 232 A1 | 7/2000 |
| JP | 63-287937 | 11/1988 |
| JP | 02-234144 | 9/1990 |
| JP | 2002-365519 A | 12/2002 |
| JP | 2003-066304 | 3/2003 |
| JP | 2003-248164 A | 9/2003 |

* cited by examiner

*Primary Examiner*—Timothy J Henn
(74) *Attorney, Agent, or Firm*—Birch, Stewart, Kolasch & Birch, LLP

(57) ABSTRACT

The present invention provides an AF-area display apparatus integrated in a lens unit that is interchangeably mounted on a camera and has an automatic focusing device for controlling focusing in such a way that the camera is focused on a photographic subject within an AF area in an imaging area of the camera, or connected as an auxiliary device to the lens unit, the AF-area display apparatus comprising: an AF-area obtaining device that obtains the AF area currently set in the automatic focusing device; a video signal generating device that generates a video signal for displaying the AF area obtained through the AF-area obtaining device; and a video signal outputting device that outputs the video signal generated by the video signal generating device.

11 Claims, 10 Drawing Sheets

FIG.10A
IMAGING AREA

FIG.10B
VIDEO SIGNAL (INPUT TO A TERMINAL)

FIG.10C
CONSTANT VOLTAGE (INPUT TO B TERMINAL)

FIG.10D
OUTPUT SWITCHING SIGNAL

FIG.10E
SYNTHESIZED VIDEO SIGNAL (OUTPUT FROM C TERMINAL)

AF-AREA DISPLAY APPARATUS AND AF-AREA OPERATION APPARATUS

BACKGROUND OF THE INVENTION

1. Field of the Invention

The present invention relates to AF-area display apparatuses and AF-area operation apparatuses, and particularly to an AF-area display apparatus for displaying an AF-area as a subject area for automatic focusing (AF), in an imaging area of a camera, and an AF-area operation apparatus for implementing operation related to an AF-area position and the like.

2. Description of the Related Art

In an imaging system, such as a television camera, that converts through an image pickup device (such as CCD) an image of a photographic subject into an electrical signal (image signal), in general, the contrast system has been employed, as a method for automatic focusing (referred to as AF, hereinafter). In contrast system, by detecting a contrast of a photographic-subject image from an image signal (video signal) for the photographic-subject image introduced by an image pickup device, and by controlling focus (a focus lens) of the image pickup lens in such a way that the contrast becomes maximal, focusing is automatically implemented so as to be in the best condition.

In the contrast-system AF, in many cases, instead of the entire imaging area of a camera, only a photographic subject within part of the entire imaging area is utilized. For instance, focusing is controlled in such a way that, by extracting an image signal within a predetermined area, as a subject of AF, from the entire image signal for a photographic-subject image that is effectively picked up by a image pickup device, the contrast of the image becomes maximal. Accordingly, the subject of AF is limited to a photographic subject within a partial area. In addition, in the present specification, a subject area of AF is referred to as "AF area", and the frame (outline of the AF area) that indicates the AF area is referred to as "AF frame".

Moreover, for example, as Japanese Patent Application Laid-Open No. 2002-365519, a contrast-system AF is proposed in which, in accordance with operation of an operator, the position of an AF area can be shifted, and the AF area is displayed through an AF frame in the screen for a viewfinder.

SUMMARY OF THE INVENTION

Meanwhile, in general, a television camera system for broadcasting is configured of a camera (camera head) including a image pickup device and a desired signal processing circuit, a lens unit (interchangeable lens) interchangeably mounted on the camera, a viewfinder for displaying the video signal for a picked-up image, or the like, outputted from the camera, and the like. In camera systems such as this, a camera system is known in which, in order to enable focusing through AF, the lens unit is equipped with an AF function. Moreover, a camera system having an AF-area display function is known in which, as an AF function, the camera obtains from the lens unit AF-area information indicating the AF area (position, size, and the like), and, e.g., by synthesizing a picked-up image with the image for an AF frame, based on the AF-area information, the synthesized image is displayed on a viewfinder.

However, some cameras have no AF-area display function; therefore, in the case where a camera having no AF-area display function is utilized, change of the AF area disables a cameraman to know at which position in the imaging area and in which size the AF area is currently set. Accordingly, in the case where, even when a lens unit has an AF-area changing function, the camera has no AF-area display function, it has been required that, by, for example, positioning and fixing to a predetermined size the AF area, thereby prohibiting the change of AF area, inexpedience is prevented in which the AF area being set currently cannot be recognized.

The present invention has been implemented in consideration of the foregoing circumstances; it is an object of the present invention to provide an AF-area display apparatus and an AF-area operation apparatus that can display the AF area so as to be recognized by the operator, even when a camera having no AF-area display function is utilized.

In order to achieve the foregoing object, an AF-area display apparatus, described in a first aspect, that is integrated in a lens unit which is interchangeably mounted on a camera and has an automatic focusing device for controlling focusing in such a way that the camera is focused on a photographic subject within an AF area in an imaging area of the camera, or that is connected as an auxiliary device to the lens unit, is characterized by including an AF-area obtaining device that obtains the AF area currently set in the automatic focusing device, a video signal generating device that generates a video signal for displaying the AF area obtained through the AF-area obtaining device, and a video signal outputting device that outputs the video signal generated by the video signal generating device.

According to the present invention, even in the case where a camera has no AF-area display function, an AF-area display apparatus of the present invention can generate a video signal for displaying an AF area; therefore, by outputting the video signal, e.g., to a monitor, the cameraman can recognize the currently set AF area, whereby prohibition of changing the AF area is not required.

An AF-area display apparatus according to a second aspect is characterized in that, in the invention described in the first aspect, the video signal generating device generates a video signal for displaying video for a frame indicating an imaging area of the camera and for an AF frame indicating an AF area in the frame. The present invention represents an embodiment of video for displaying an AF area.

An AF-area display apparatus according to a third aspect is characterized in that, in the invention described in the first or the second aspect, the lens unit has an AF-area information outputting connector that outputs AF-area information indicating the AF area currently set in the automatic focusing device, the AF-area display apparatus is connected as an auxiliary device to the AF-area information outputting connector, and the AF-area obtaining device obtains AF-area information outputted from the AF-area information outputting connector, thereby obtaining the AF area. The present invention represents an embodiment of a method in which, in the case where the AF-area display apparatus is an auxiliary device (adapter), an AF area is obtained from the lens unit.

An AF-area display apparatus according to a fourth aspect is characterized by, in the invention described in the first, the second, or the third aspect, further comprising a display device that displays video based on a video signal outputted through the video signal outputting device. In stead of displaying on a monitor separated from the AF-area display apparatus, the present invention displays the video for displaying an AF area, on a monitor integrated in the AF-area display apparatus.

An AF-area operation apparatus, described in a fifth aspect, that is utilized in an automatic focusing system for automatically implementing focusing adjustment of an optical system of a camera in such a way that the camera is focused on a photographic subject within a predetermined AF area in an imaging area of the camera, and that implements operation related to the AF area, is characterized by being configured as a device separated from the camera and including a video signal obtaining device that obtains a video signal for picked-up video picked up through the camera, an AF-area information synthesizing device that generates a video signal for video obtained by synthesizing picked-up video as a video signal obtained through the video signal obtaining device and information on the AF area, and an outputting device that outputs a video signal generated by the AF-area information synthesizing device.

According to the present invention, even in the case where a camera has no AF-area display function for displaying information on the AF area, by outputting through an AF-area operation apparatus according to the present invention a video signal of the camera to a viewfinder or the like, video obtained by synthesizing picked-up video and information on the AF area can be displayed on a viewfinder or the like. Accordingly, the operator can recognize the AF area.

An AF-area operation apparatus described in a sixth aspect is characterized in that, in the invention described in the fifth aspect, the AF-area information synthesizing device generates a video signal for video obtained by synthesizing an image for an AF frame, as information on the AF area, indicating the outline of the AF area and the picked-up video. The present invention synthesizes an AF frame as information on an AF area and picked-up video.

An AF-area display apparatus and an AF-area operation apparatus according to the present invention can display the AF area so as to be recognized by the operator, even when a camera having no AF-area display function is utilized.

DETAILED DESCRIPTION OF THE PREFERRED EMBODIMENTS

A preferred embodiment of an AF-area display apparatus according to the present invention will be explained in detail below, with reference to the accompanying drawings.

Figure 1:
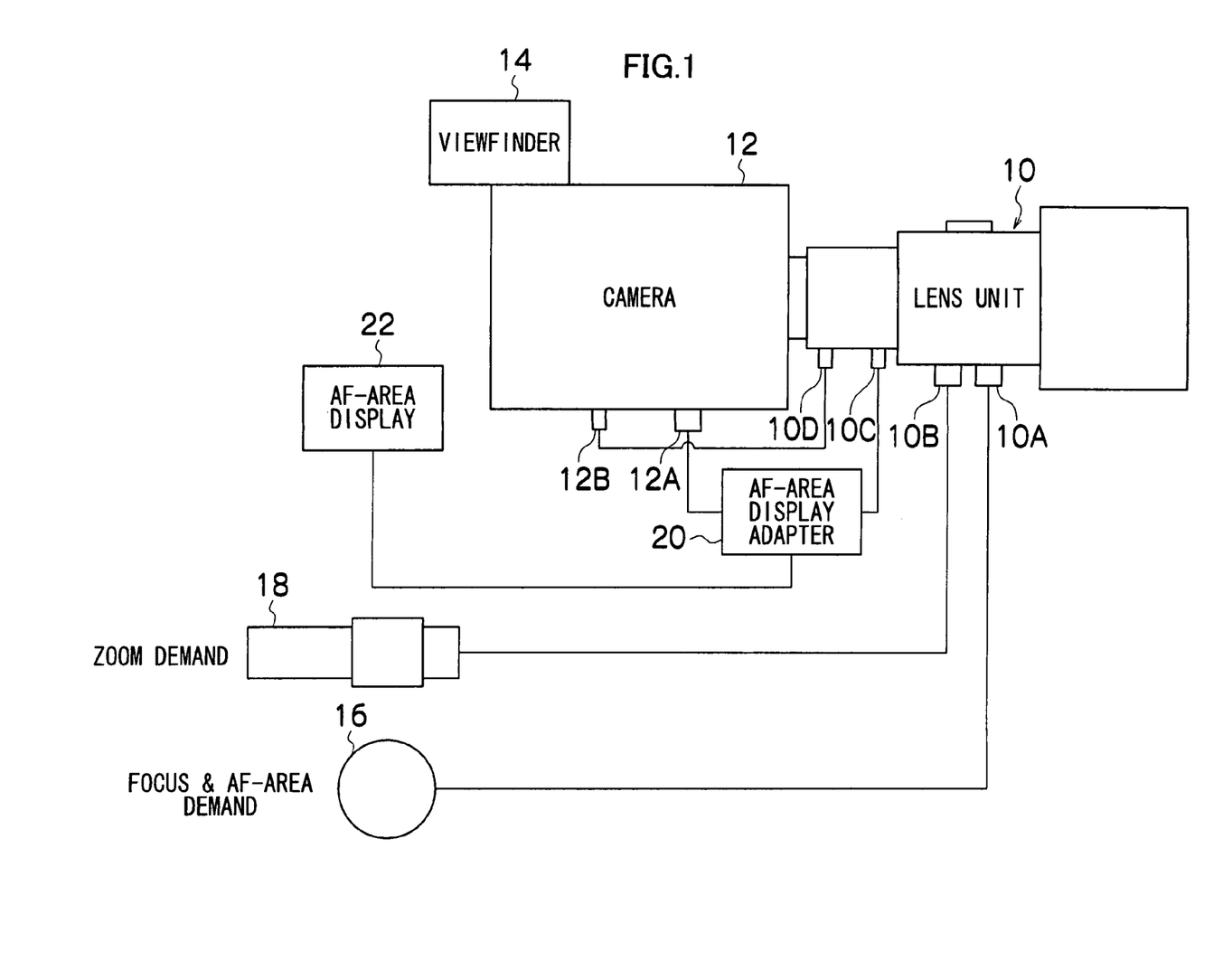
FIG. 1 is a block diagram illustrating the appearance of an embodiment of a television camera system in which an AF-area display apparatus according to the present invention is integrated.

FIG. 1 is a block diagram illustrating an embodiment of a television camera system in which an AF-area display apparatus according to the present invention is integrated. In FIG. 1, a lens unit 10 has an optical system including optical components, such as a group of focus lenses, a group of zoom lenses, and a diaphragm, and a control system for controlling the optical system; the camera cone for retaining the optical components of the optical system is coupled with a lens-interchangeable camera (camera head) 12 for television broadcasting.

The camera 12 is equipped with an image pickup device, such as a CCD, and a desired signal processing circuit. Photographic-subject images are formed on the image pickup plane of the image pickup device of the camera 12, through the optical system of the lens unit 10, and the image pickup device implements photoelectrical conversion of the photographic-subject images one by one. Thereafter, the signal processing circuit applies a desired signal processing to the signal outputted from the image pickup device. Accordingly, an image (video) for the photographic subject is picked up, and a video signal for the video is generated.

A viewfinder 14 and the camera 12 are coupled and electrically connected with each other. For example, the video signal of a picked-up image being currently picked up through the camera 12 is outputted to the viewfinder 14; the picked-up image is displayed on the screen of the viewfinder 14.

A number of electrical connectors are provided on the lens unit 10 and the camera 12; a focus & AF-area demand 16 for implementing operation related to focusing and to an AF area that is an subject area for AF, in an automatic focusing (AF) function, is connected through a cable to a connector 10A of the lens unit. A zoom demand 18 for implementing operation related to zooming is connected through a cable to the connector 10B of the lens unit 10.

An AF-area display adapter 20 that is an AF-area display apparatus according to the present invention, configured as an auxiliary device of the lens unit 10, is connected through a cable to a connector 10C of the lens unit 10 and to a connector 12A of the camera 12. In this situation, even if the camera 12 in the present embodiment obtains AF-area information, indicating an AF area (area determined, e.g., through the position, size, and shape, of the AF area in an imaging area), that is outputted from the connector 10C of the lens unit 10, does not have a function for displaying the AF area on the viewfinder 14; however, in the case where the camera 12 has the AF-area display function, by directly connecting through a cable the connector 10C of the lens unit 10 and the connector 12A of the camera 12, the AF area may be displayed on the viewfinder 14.

The AF-area display adapter 20 obtains the AF-area information outputted from the lens unit 10, and, as described later, generates video (a video signal) for displaying the AF area. An AF-area display (monitor) 22 is connected to the AF-area display adapter 20; the AF-area video generated by the AF-area display adapter 20 is displayed on the AF-area display 22. Moreover, in addition to the AF-area information, the AF-area display adapter 20 directly transfers signals (such as an iris signal), from the sender to the receiver, that are sent and received between the lens unit 10 and the camera 12.

A connector 12B of the camera 12 is connected through a cable to a connector 10D of the lens unit 10. The lens unit 10 has an automatic focusing (AF) function for automatically implementing focusing, based on the video signal of video being picked up through the camera 12; a video signal utilized in the AF function is introduced, through the connector 10D of the lens unit 10, from the connector 12B of the camera 12 to the lens unit 10.

Figure 2:
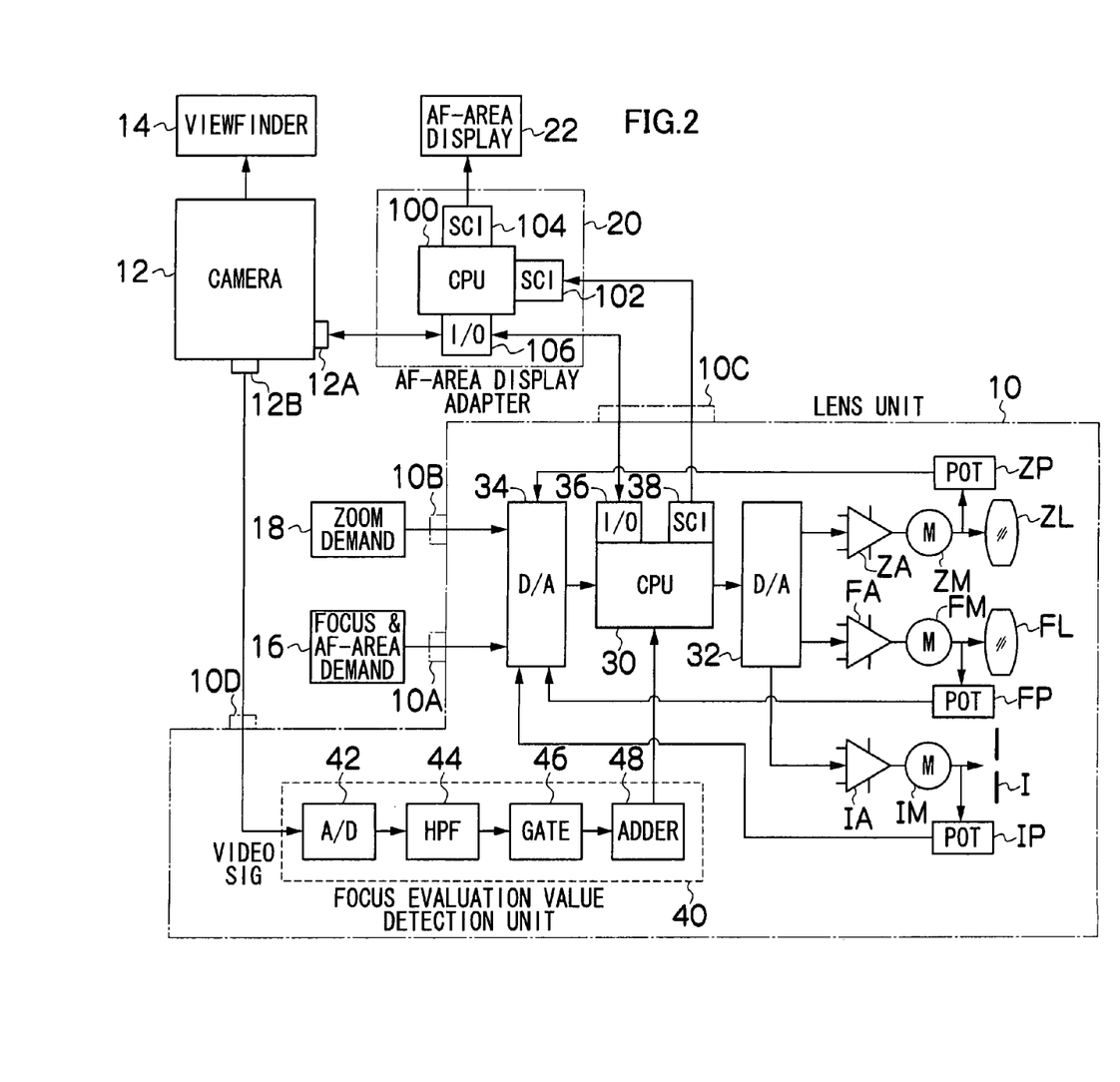
FIG. 2 is a block diagram illustrating mainly a processing block related to the AF function in the television camera system in FIG. 1.

FIG. 2 is a block diagram illustrating mainly a processing block related to the AF function in the foregoing television camera system. In FIG. 2, motors FM, ZM and IM and potentiometers FP, ZP, and IP are coupled with a group of focus lenses FL, a group of zoom lenses ZL, and a diaphragm I, respectively; the group of focus lenses FL, the group of zoom lenses ZL, and the diaphragm I are driven by the motors FM, ZM and IM, respectively, and voltage positional signals corresponding to respective setting positions of the group of focus lenses FL, the group of zoom lenses ZL and the diaphragm I are outputted from the potentiometers FP, ZP, and IP.

The lens unit 10 is equipped with a CPU 30 for integrally controlling the entire system. Amplifiers FA, ZA, and IA that are connected to the respective motors FM, ZM, and IM are connected through a D/A converter 32 to the CPU 30; the CPU 30 controls the rotating speeds of the motors FM, ZM, and IM, through the values of respective drive signals to be applied to the amplifiers FA, ZA, and IA, and obtains through a A/D converter 34 the positional signals outputted from the respective potentiometers FP, ZP, and IP, so that the group of focus lenses FL, the group of zoom lenses ZL, and the diaphragm I can be controlled so as to be at desired positions and operating speeds.

Signals outputted from the focus & AF-area demand 16 connected to the connector 10A of the lens unit 10 and the zoom demand 18 connected to the connector 10B are read out by the CPU 30, by way of the A/D converter 34. As described in detail later, the control (focus control) of the group of focus lenses FL can be switched between automatic focusing (AF) and manual focusing (MF); in the case of MF, the focus control is implemented in accordance with a focus command signal issued by the focus & AF-area demand 16. In other words, in the MF mode, the CPU 30 reads the value of the focus command signal issued by the focus & AF-area demand 16, and makes the group of focus lenses FL move to the position corresponding to the value of the focus command signal, while regarding the value, e.g., as a value to indicate a target position.

The control (zoom control) of the group of zoom lenses ZL is implemented in accordance with a zoom command signal issued by the zoom demand 18; the CPU 30 reads the value of the zoom command signal issued by the zoom demand 18, and makes the group of zoom lenses ZL move to at a speed corresponding to the value of the zoom command signal, while regarding the value, e.g., as a value to indicate a target speed.

Meanwhile, the control of the diaphragm I is implemented based on an iris signal issued by the camera 12. The iris signal is outputted from the connector 12A of the camera 12, inputted through the connector 10C of the lens unit 10 to the lens unit 10, by way of the AF-area display adapter 20 described in detail later, and read by the CPU 30, by way of an I/O port 36. The CPU 30 set the diaphragm I to the position (aperture ratio) corresponding to the value of the iris signal.

Figure 3:
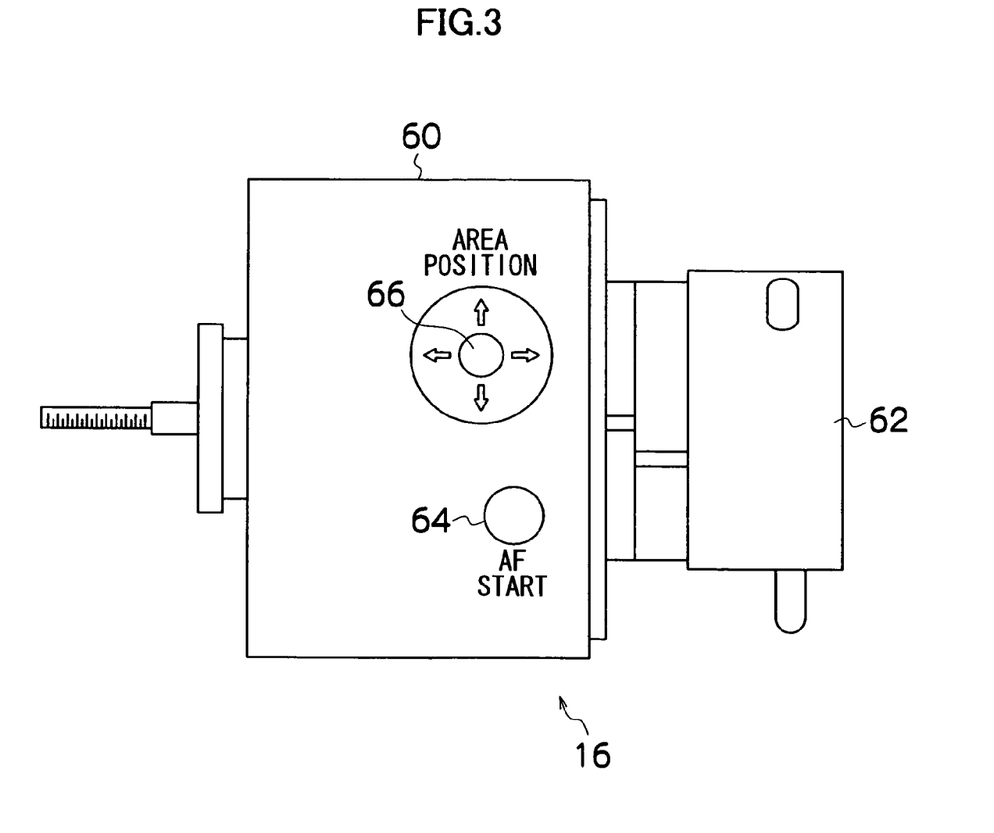
FIG. 3 is a block diagram illustrating the appearance of a focus & AF-area demand.

The configuration and processing related to the focus control will be explained in detail below. The focus & AF-area demand 16 is configured as illustrated in FIG. 3. As illustrated in FIG. 3, the focus & AF-area demand 16 has a cylindrical main body 60 in which various kinds of circuits are incorporated; a focus knob 62 is pivotably provided on the main body 60. The focus & AF-area demand 16 is adapted to output the focus command signal corresponding to a pivoting position of the focus knob 62; as described above, in the MF mode, the group of focus lenses FL is controlled in accordance with the focus command signal.

An AF start switch 64 is arranged on the side surface of the main body 60 of the focus & AF-area demand 16. The AF start switch 64 is a switch for initiating the AF control; when, in the MF mode, the AF start switch 64 is turned ON, a signal from the AF start switch 64 is forwarded to the CPU 30 of the lens unit 10, and the CPU 30 starts the AF control. Meanwhile, when, during the AF control, the focus knob 62 is pivotally operated, thereby changing the value of the focus command signal, the control is switched from the AF control to the MF control. The switching between the AF and the MF is not limited to the method in the present embodiment; for example, the switching may be implemented through a switch that makes selection between the AF mode and the MF mode.

In addition, a joystick 66 as an operational member is provided on the side surface of the main body 60 of the focus & AF-area demand 16; the joystick 66 will be explained later.

During the AF control, the CPU 30 reads focus information (a focus evaluation value) that is detected by a focus evaluation value detection unit 40 illustrated in FIG. 2, and controls the group of focus lenses FL, based on the focus information. As illustrated also in FIG. 1, the video signal for video being picked up by the camera 12 is outputted from the connector 12B of the camera 12, and the video signal is inputted through the connector 10D of the lens unit 10. The video signal that has been inputted through the connector 10D of the lens unit 10 is received by the focus evaluation value detection unit 40.

The focus evaluation value detection unit 40 is configured of an A/D converter 42, a highpass filter (HPF) 44, a gate circuit 46, and a adding circuit 48; the video signal that has been received by the focus evaluation value detection unit 40 is firstly converted by the A/D converter 42 into a digital signal. Subsequently, after the highpass filter (HPF) 44 extracts only the high-frequency components from the video signal, the extracted high-frequency components is inputted to the gate circuit 46. Thereafter, only the signal that is within the AF area set in the imaging area is extracted by the gate circuit 46. In addition, the signal extraction area (AF area) for the gate circuit 46 is set in accordance with an instruction signal from the CPU 30.

The high-frequency-component signal, within the AF area, that has been extracted by the gate circuit 46 is accumulated on a field-by-field basis in the adding circuit 48; the resultant accumulated value is forwarded, as a focus evaluation value, to the CPU 30.

The focus evaluation value obtained in the foregoing way is a value for evaluating the contrast level of the video (photographic-subject image), being picked up by the camera 12, within the AF area; the CPU 30 controls the group of focus lenses FL so that the focus evaluation value obtained from the focus evaluation value detection unit 40 becomes maximal (locally maximal). For example, while, through so-called "wobbling", i.e., microscopic vibration of the group of focus lenses FL, a direction is detected in which the focus evaluation value increases, the group of focus lenses FL is made to move in the direction, and then stopped at the position where no increase in the focus evaluation value is detected. Accordingly, the group of focus lenses FL is set at the position where the contrast of the photographic-subject image in the AF area is maximal, and focused on the photographic subject in the AF area.

Figure 4:
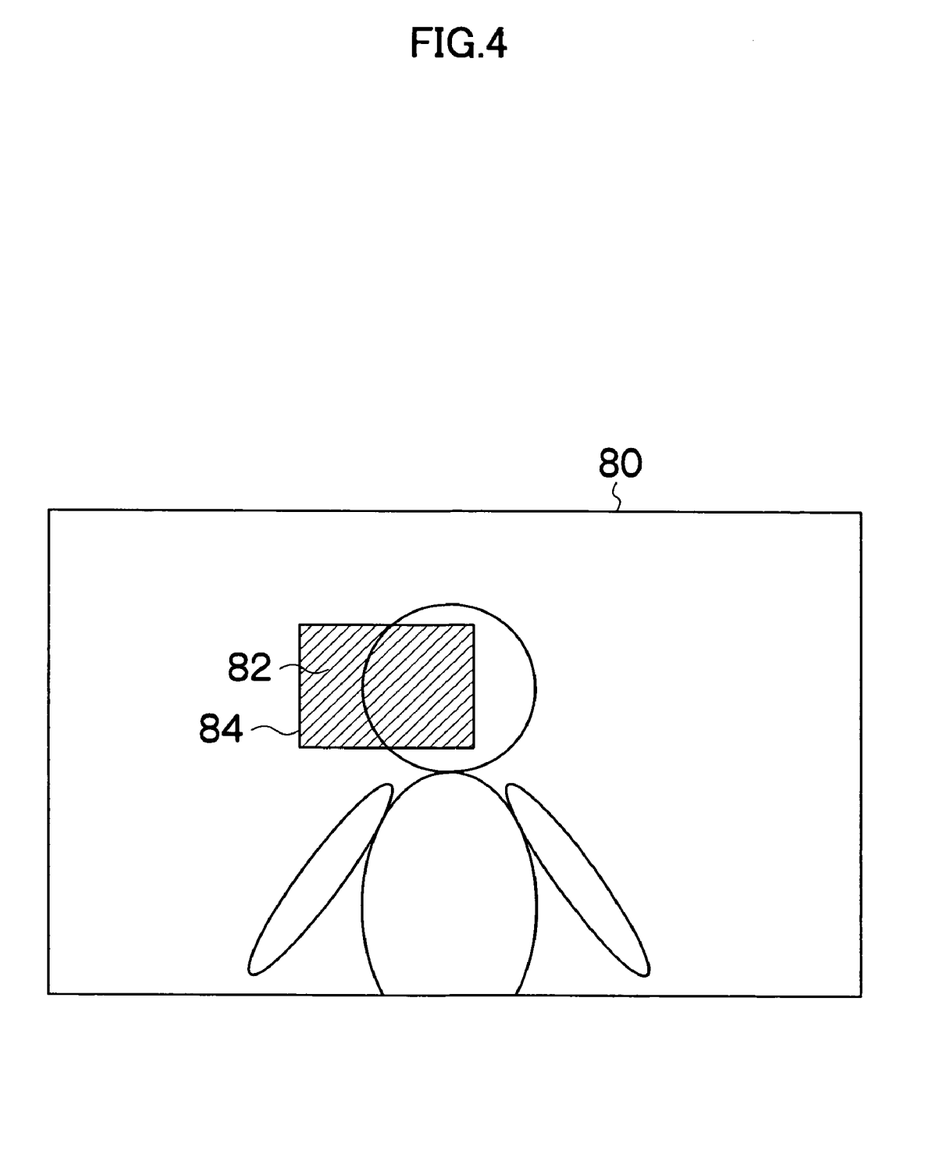
FIG. 4 is an explanatory view for explaining an AF area.

Subsequently, the AF area will be explained. Letting an imaging area denote the area of a photographic subject, or a photographic-subject image, effectively picked up by the image pickup device of the camera 12, as illustrated in FIG. 4, for the imaging area (area of a frame 80), an AF area 82 as a target area of the AF is set, e.g., as an area within a rectangular AF frame 84. In addition, in the case where a photographic-subject image (video) picked up by the image pickup device of the camera 12 is reproduced and displayed on the screen of the viewfinder 14 or the like, the imaging area corresponds to the frame area for the video.

The CPU 30 sets the AF area 82 in the imaging area, for example, in consideration of the position (center position), the size, and the shape, of the AF area 82; however, in the present embodiment, the shape of the AF area 82 is fixed to rectangular, and the size of the AF area 82 is fixed to be constant. In contrast, the position of the AF area can be changed by the operator to a desired position, by operating the joystick 66 of the focus & AF-area demand 16 illustrated in FIG. 3.

An operation signal indicating operation of the joystick 66 is outputted from the focus & AF-area demand 16, and, in FIG. 2, forwarded through the A/D converter 34 to the CPU 30. The CPU 30 detects based on the operation signal the direction, of operating the joystick 66, among upward, downward, rightward, and leftward directions, and changes in accordance with the operation direction the position of the AF area 82 in the imaging area from the currently set position. For instance, in the case where, viewed from the opposing position, the joystick 66 is operated leftward, the CPU 30 moves the position of the AF area 82 (the AF frame 84) by a predetermined amount leftward in the imaging area 80 in FIG. 4. Similarly, in the case where the joystick 66 is operated rightward, upward, or downward, the CPU 30 moves the position of the AF area 82 by a predetermined amount, in the same direction as that of the operational direction, i.e., rightward, upward, or downward, respectively. Moreover, for example, each time a specific duration elapses in which the joystick 66 is kept being operated in a specific direction, the CPU 30 moves by a predetermined amount the position of the AF area 82, in the same direction as that of the operation direction, thereby continually shifting the position of the AF area 82. In addition, the moving speed of the AF area 82 may be increased in proportion to the operation amount (gradient angle) of the joystick 66.

Based on the position of the AF area to be changed in the foregoing way and the size and the position, of the AF area, that have been preliminarily determined, the CPU 30 of the lens unit 10 determines the AF area, and forwards to the gate circuit 46 of the focus evaluation value detection unit 40 the instruction signal to instruct that the set AF area is an area for extracting a signal. In consequence, the gate circuit 46 extracts the video signal within the AF area, and the focus evaluation value detection unit 40 forwards to the CPU 30 the focus evaluation value for the photographic-subject image within the AF area.

In addition, the AF area currently set in the lens unit 10 is displayed on the AF-area display 22, by way of the AF-area display adapter 20 illustrated in FIGS. 1 and 2. Explaining the AF-area display adapter 20, as illustrated in FIG. 2, the AF-area display adapter 20 is equipped with a CPU 100, serial communication interfaces (SCI) 102 and 104, and an I/O port 106. As illustrated also in FIG. 1, the AF-area display adapter 20 is connected through a cable to the connector 10C of the lens unit 10 and to the connector 12A of the camera 12; respective cables connected to the connector 10C of the lens unit 10 connect the I/O port 36 of the lens unit 10 with the I/O port 106 of the AF-area display adapter 20, and a SCI 38 of the lens unit 10 with the SCI 102 of the AF-area display adapter 20. Moreover, a cable connected to the connector 12A of the camera 12 connects an unillustrated I/O port in the camera 12 with the I/O port 106 of the AF-area display adapter 20.

The CPU 100 of the AF-area display adapter 20 directly transmits to the lens unit 10 a signal (such as an iris signal) that is outputted from the camera 12 and inputted to the I/O port 106, and the signal can be read by the CPU 30 of the lens unit 10, by way of the I/O port 36. On the other hand, the CPU 100 directly transmits to the camera 12 a signal (information on a position of the group of focusing lenses, or the like) that is outputted from the I/O port 36 of the CPU 30 of the lens unit 10 and inputted to the I/O port 106 of the AF-area display adapter 20, and the signal can be read by the camera 12. Accordingly, reception and transmission, of necessary signals, between the lens unit 10 and the camera 12 are enabled.

In contrast, the CPU 30 of the lens unit 12 outputs through the SCI 38 AF-area information (information on the position, size, and shape, of an AF area) that indicates the currently set AF area, and the AF-area information is read by the CPU 100, by way of the SCI 102 of the AF-area display adapter.

Figure 5:
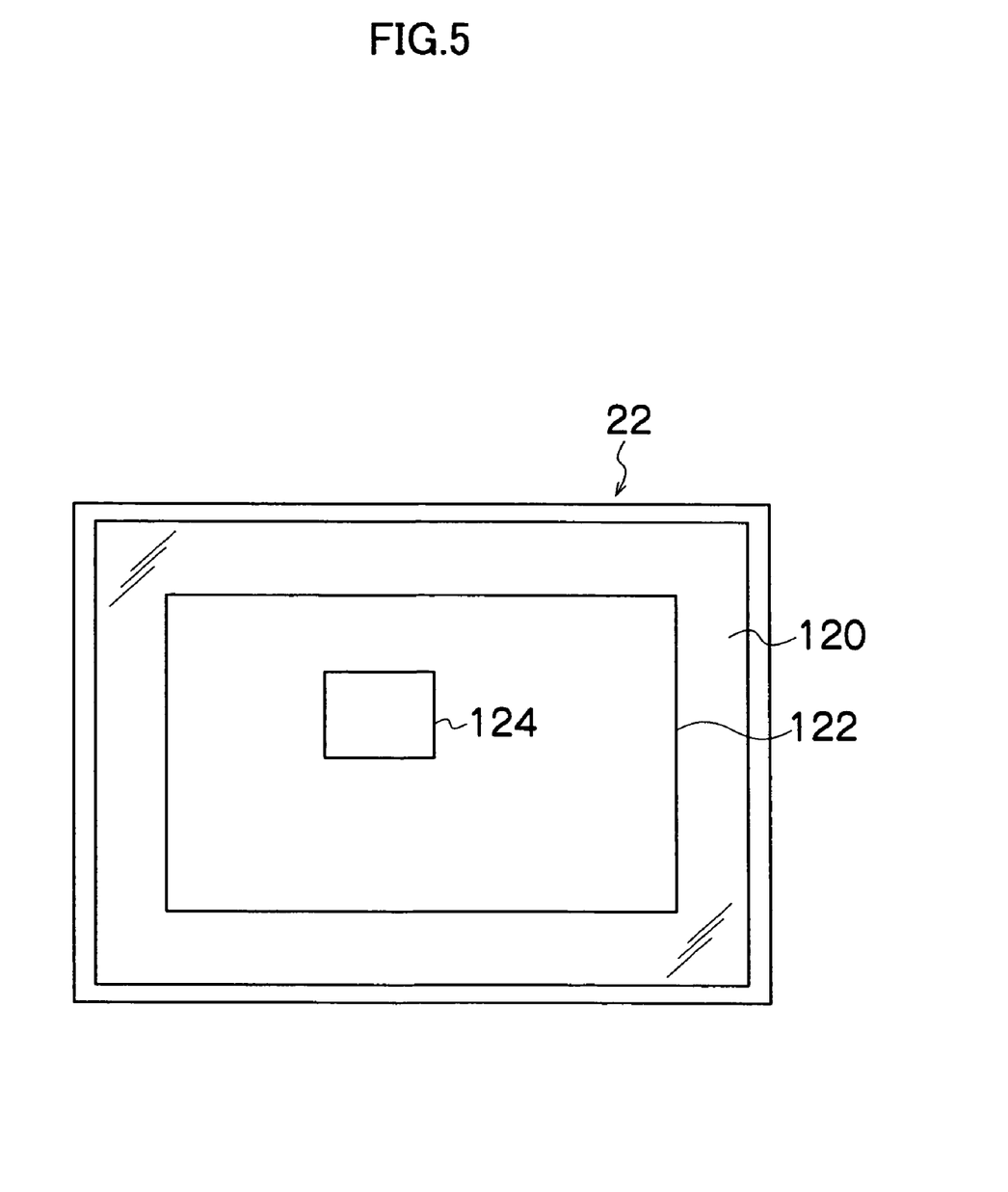
FIG. 5 is a view illustrating an embodiment of an AF area displayed on an AF-area display.

Based on the AF-area information forwarded from the lens unit 12, the CPU 100 of the AF-area display adapter 20 creates, e.g., images (video) for a frame indicating the imaging area of the camera 12 and an AF frame (a frame indicating the outline of the AF area) indicating the AF area currently set within the imaging area, and produces the video signals, for the images, that are outputted through the SCI 104 to the AF-area display 22. Accordingly, as illustrated in FIG. 5, an imaging-area frame 122 and an AF frame 124 are displayed on a screen 120 of the AF-area display 22.

As described above, even in the case where the camera 12 is not provided with the AF-area display function, by connecting the AF-area display adapter 20 to the connector, of the lens unit 10, through which the AF-area information is outputted, a video signal for displaying the AF area is generated, whereby the video can be displayed on the AF-area display 22. Accordingly, by seeing the display, a cameraman can recognize the currently set AF area, whereby the AF area can readily be changed to a desired area (position, or the like).

As described heretofore, in the foregoing embodiment, an aspect has been explained in which only the position of an AF area can be changed through the focus & AF-area demand 16; however, in addition to the position, the size and the shape of an AF area, as factors that determine the AF area, may also be changed by operation through the focus & AF-area demand 16. Moreover, the operation related to focusing and to the AF area may not be implemented through a single controller, but through separated controllers.

Still moreover, in the foregoing embodiment, a case has been described in which the AF-area display adapter 20 and the AF-area display 22 for displaying video created by the AF-area display adapter 20 are separated devices; however, the AF-area display adapter 20 and the AF-area display 22 may be integrated in a single device.

Furthermore, in the foregoing embodiment, a case has been described in which, in order to display an AF area, the video for the AF-area that is created by the AF-area display adapter 20 and displayed on the AF-area display 22 is represented, as illustrated in FIG. 5, by the video of the frame 122 that indicates the imaging area and the AF frame 124; however, the AF area may be displayed with video having a different appearance.

Still furthermore, in the foregoing embodiment, a case has been described in which AF-area video created by the AF-area display adapter 20 is directly displayed on the AF-area display 22; however, for example, by introducing to an image processing apparatus a video signal outputted from the AF-area display adapter 20 and the video signal, for an picked-up image, that is outputted from the camera 12 to the viewfinder 14, and synthesizing the video, thereby superimposing video, such as an AF frame, indicating an AF area, on the picked up image, the synthesized video may be outputted from the image processing apparatus to the viewfinder 14.

Moreover, in the foregoing embodiment, by configuring the AF-area display 22 with a transmissive LCD panel on which video is displayed, and fixing the LCD panel before the screen of the viewfinder 14, an AF area (such as an AF frame) may be displayed in such a way as to be overlapped with a picked-up image displayed on the screen of the viewfinder 14.

Still moreover, the present invention can be applied to an AF utilizing a method other than that in the foregoing embodiment.

Furthermore, in the foregoing embodiment, a case has been explained in which an AF-area display apparatus according to the present invention is configured as an auxiliary device independent from the lens unit 10; however, by enabling the processing, related to display of the AF area, in the AF-area display adapter 20 to be implemented in the lens unit 10, the AF-area display apparatus according to the present invention and the lens unit 10 may be integrated into a single apparatus.

Next, a preferred embodiment of an AF-area operation apparatus will be explained in detail.

Figure 6:
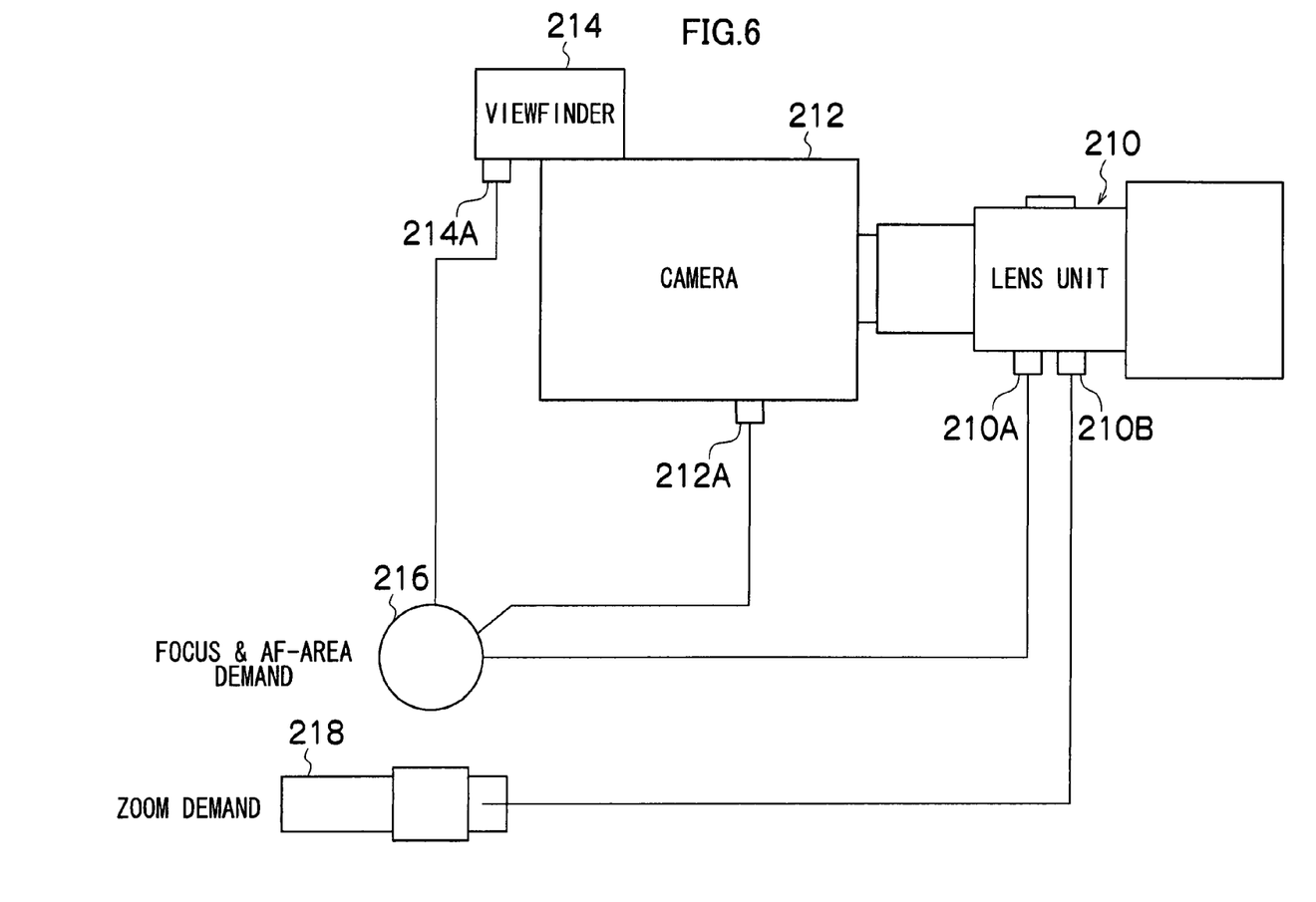
FIG. 6 is a block diagram illustrating the appearance of an embodiment of a television camera system in which an AF-area operation apparatus according to the present invention is utilized.

FIG. 6 is a block diagram illustrating an embodiment of a television camera system in which an AF-area operation apparatus according to the present invention is utilized. In FIG. 6, a lens unit 210 has an optical system including optical components, such as a group of focus lenses, a group of zoom lenses, and a diaphragm, and a control system for controlling the optical system; the camera cone for retaining the optical components of the optical system is coupled with a lens-interchangeable camera (camera head) 212 for television broadcasting.

The camera 212 is equipped with an image pickup device, such as a CCD, and desired signal processing circuits. Photographic-subject images are formed on the image pickup plane of the image pickup device of the camera1 212, through the optical system of the lens unit 210, and the image pickup device implements photoelectrical conversion of the photographic-subject images one by one. Thereafter, the signal processing circuit applies a desired signal processing to the signal outputted from the image pickup device. Accordingly, an image (video) for the photographic subject is picked up, and a video signal for the video is generated.

In addition, a viewfinder 214 is mounted on the camera 212. The video signal for a picked-up image being currently picked up is outputted from a video signal output connector 212A; a focus & AF-area demand 216 described later is connected through respective cables to the video signal output connector 212A and to a video signal input connector 214A. Accordingly, a video signal outputted from the video signal output connector 212A of the camera 212 is inputted through the focus & AF-area demand 216 to the video signal input connector 214A of the viewfinder 214, whereby an image picked up by the camera 212 is displayed on the screen of the viewfinder 214.

In addition, in general, the video signal for a picked-up image is directly forwarded from the camera 212 to the viewfinder 214; however, because the camera 212 in the present embodiment is a type of camera that does not have a function (AF-area display function) for displaying an AF area (area determined, e.g., through the position, size, and shape, of the AF area in an imaging area) as a target area for focusing in an automatic focusing (AF) function, the video signal for the picked-up image is forwarded to the viewfinder 214, through the focus & AF-area demand 216 provided with a function for synthesizing an AF frame indicating the AF area (outline) and the picked-up image.

A number of electrical connectors are provided on the lens unit 210; a focus & AF area demand 216 for implementing general operation related to focusing and operation related to an AF area (AF frame) is connected through a cable to a connector 210A of the lens unit 210. A zoom demand 18 for implementing operation related to zooming is connected through a cable to the connector 210B of the lens unit 210.

Figure 7:
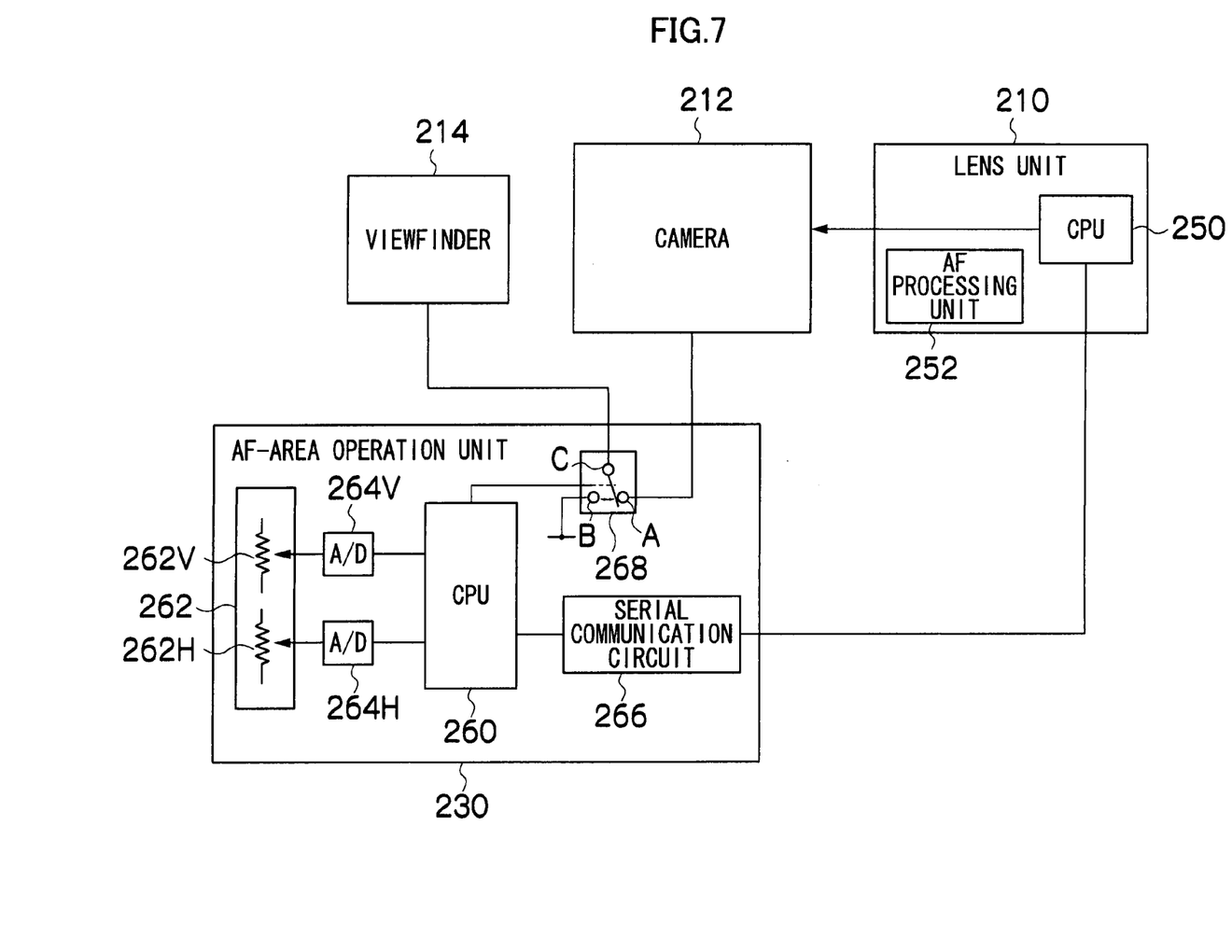
FIG. 7 is a block diagram illustrating a configuration of an automatic focus system related to the AF function in a television camera system in FIG. 6.

FIG. 7 is a block diagram illustrating mainly an automatic focus system related to the AF function in the foregoing television camera system. The automatic focus system illustrated in FIG. 7 is configured of the lens unit 210, the camera 212, the viewfinder 214, and an AF-area operation unit 230 integrated in the focus & AF-area demand 216.

The lens unit 210 incorporates a CPU 250 and an AF processing unit 252. In addition, the lens unit 210 includes an unillustrated optical system (image pickup lens) for focusing photographic-subject light on the image pickup plane of the image pickup device of the camera 212; groups of lenses that are movable in the optical axis, such as focus lenses and zoom lenses, a group of fixed lenses, and the like are arranged in the optical system. The respective groups of lenses are each driven by unillustrated motors, in accordance with control signals from the CPU 250; the positions and speeds of the group of focus lenses, the group of zoom lenses, and the like are controlled by CPU 250.

The control of focus lenses (focus control) includes manual focusing (MF) and automatic focusing (AF); in the MF mode, the CPU 250 obtains a focus control signal outputted in accordance with operation of the manual operation member (focus knob) of the focus & AF-area demand 216 illustrated in FIG. 6, and controls the focus lenses so that the group of focus lenses is at a target position instructed through the focus control signal.

In contrast, in the AF mode, focus information (a focus evaluation value) that is detected by the AF processing unit 252 is forwarded to the CPU 250, and the group of focus lenses is controlled, based on the focus information. The lens unit 210, according to the present embodiment, is equipped, for example, with an image pickup device (image pickup device for AF) for obtaining a video signal for the AF processing. In the light path of the image pickup lens, a light splitting device such as a half mirror is arranged; photographic-subject light that is split through the light splitting device from original photographic-subject light, which has entered the image pickup device of the camera 212, is focused on the image pickup plane of the image pickup device for AF. The automatic focus system is configured in such a way that the image pickup area (angle of view) in the imaging area and the photographic-subject distance (distance between the photographic subject and the image pickup device, at which the photographic subject is in focus), of the image pickup device for AF, coincides to the image pickup area (angle of view) in the imaging area of the image pickup device and the photographic-subject distance, of the camera 212; the image (video) picked up through the image pickup device for AF coincides to the image (video) picked up through the image pickup device of the camera 212. In addition, both the image pickup areas should not necessarily coincide to each other; for example, the image pickup area of the image pickup device for AF may be large enough to encompass that of the image pickup device of the camera 212. Moreover, in stead of mounting the image pickup device for AF on the lens unit 210, a video signal from the camera 212 may be forwarded to the AF processing unit 252.

The video signal (luminance signal) for an image picked up through the image pickup device for AF is forwarded to the AF processing unit 252; the AF processing unit 252 detects based on the video signal the focus evaluation value that indicates the contrast level of a photographic-subject image.

Figure 8:
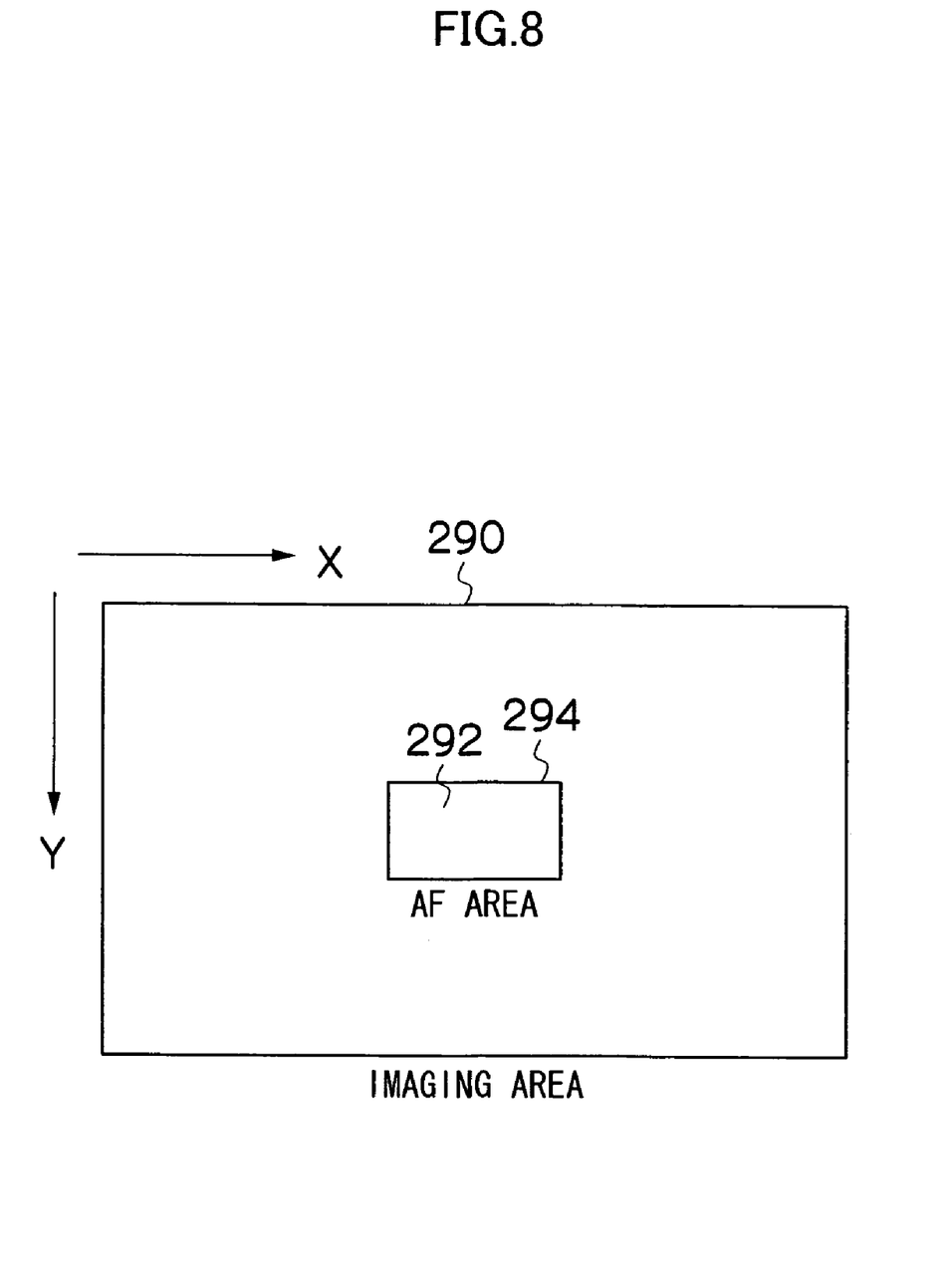
FIG. 8 is an explanatory view for explaining an AF area.

In this situation, letting an imaging area denote the area of a photographic subject, or a photographic-subject image, effectively picked up by the image pickup device (the image pickup device for AF) of the camera 212, as illustrated in FIG. 8, for an imaging area 290, an AF area 292 as a target area of the AF is set, e.g., as an area within a rectangular AF frame 294. As described later, the position and the like of the AF area 292 (the AF frame 294) within the imaging area 290 are changed in accordance with AF-area information forwarded from the AF-area operation unit 230. In addition, in the case where a photographic-subject image (picked-up video) picked up by the image pickup device of the camera 212 is reproduced and displayed on the screen of the viewfinder 214 or the like, the imaging area 290 in FIG. 8 corresponds to the frame area for the video.

In FIG. 7, the video signal forwarded to the AF processing unit 252 includes video information for the entire imaging area; the AF processing unit 252 extracts from the video signal only a portion within the AF area, and accumulates in steps of one field (one screen) the high-frequency components of the video signal. In consequence, a focus evaluation value is obtained that indicates the contrast level of a photographic-subject image within the AF area.

The CPU 250 sequentially obtains from the AF processing unit 252 the focus evaluation value as focus information, and moves the focus lenses to a position where the focus evaluation value becomes maximal (locally maximal). Accordingly, the photographic subject within the AF area can automatically become in focus.

The AF-area operation unit 230 for setting and changing the position of the AF area and the like is integrated, along with a focus operation unit for implementing MF operation, in the focus & AF-area demand 216 illustrated in FIG. 6. The AF-area operation unit 230 may be integrated in an operational device (such as the zoom demand 18) separated from the focus operation unit, or may be an operational device dedicated to the AF-area operation.

Figure 9:
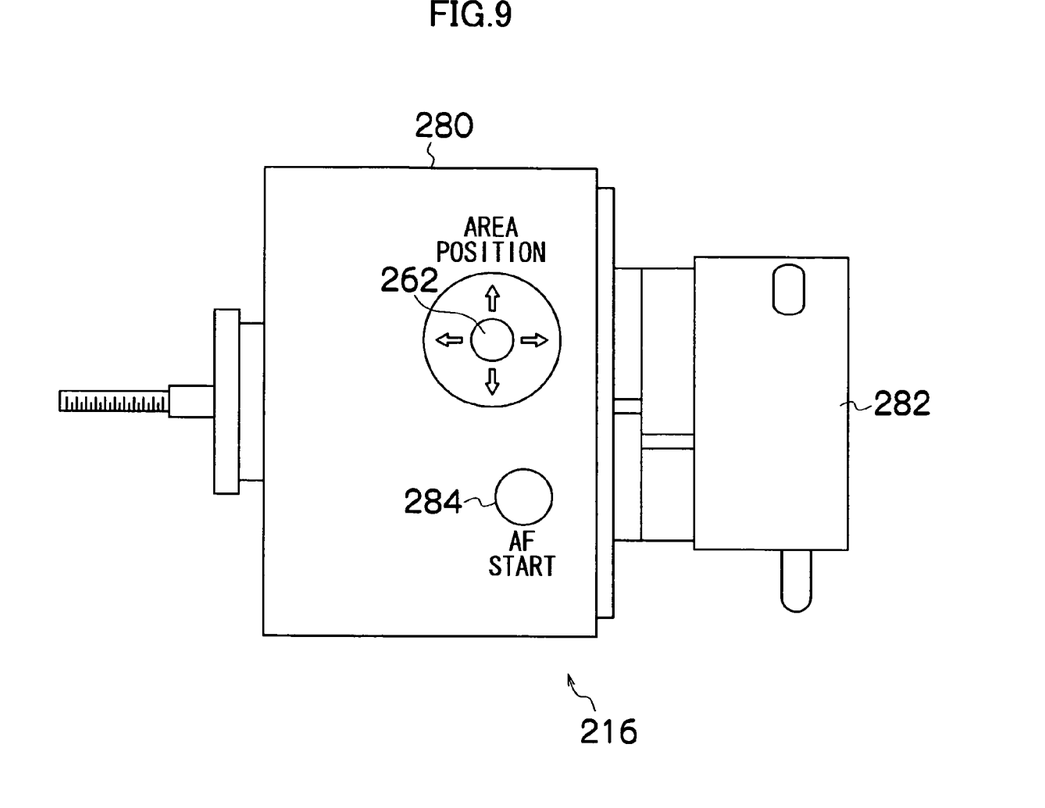
FIG. 9 is a block diagram illustrating the appearance of a focus & AF-area demand.

FIG. 9 is a plan view illustrating the appearance of the focus & AF-area demand 216. As illustrated in FIG. 9, the focus & AF-area demand 216 has a cylindrical main body 280 in which various kinds of circuits are incorporated; a focus knob 282 that, in the MF mode, is pivotally operated to specify a target travel position for the focus lenses is pivotably provided on the main body 280. On the side surface of the main body 280, an AF start switch 284 is arranged, and, as an operational member of the AF-area operation unit 230, a trackball 262 is arranged.

The AF start switch 284 is a switch for initiating the AF control; when, in the MF mode, the AF start switch 284 is turned ON, a signal from the AF start switch 64 is forwarded to the CPU 250 of the lens unit 210, and the CPU 250 starts the AF processing. In addition, switching from the AF mode to the MF mode is implemented, for example, through pivotal operation of the focus knob 282.

Meanwhile, the trackball 262 arranged as an operational member of the AF-area operation unit 230 is a direction indication member for adjusting the position of the AF area (AF frame); when the trackball 262 is pivotally operated in the up-and-down (vertical) direction or in the left-and-right (horizontal) direction, the position of the AF area, as described later, moves in accordance with the operational direction, in the up-and-down direction or in the left-and-right direction on the screen. In addition, by providing, as the operational member of the AF-area operation unit 230, an operational member for changing the size and the shape of the AF-area, the size and the shape of the AF-area may also be changed. However, in the present embodiment, it is assumed that only the position of a rectangular (quadrangular) AF area having a predetermined size can be changed. Additionally, in stead of the trackball 262, other direction indication members such as a joystick or a cross-shape key may be utilized.

A CPU for implementing respective processing items, in accordance with the operation of each of the operational members, is mounted on the main body 280 of the focus & AF-area demand 216; the CPU implements the operation of the focus knob 282 and processing based on the operation of the AF start switch 284, and processing as a role of the AF-area operation unit 230. In FIG. 7, the CPU of the focus & AF-area demand 216 is illustrated as the CPU 260 of the AF-area operation unit 230.

In FIG. 7, the CPU 260 transmits to the CPU 250 of the lens unit 210 AF-area information indicating the position, the size, and the shape, of the AF area (AF frame), through a serial communication circuit 266; the position, the size, and the shape of the AF area, in the AF processing unit 252, are set, in accordance with the AF-area information. By, based on the operation of the trackball 262, changing the position of the AF area, indicated with the AF-area information, the CPU 260 changes the position of the AF area, in the AF processing unit 252.

As illustrated in FIG. 7, in the trackball 262, position sensors (potentiometers) 262V and 262H are provided that, for the up-and-down direction and the in the left-and-right direction, output respective voltage signals having voltage values corresponding to the pivoting positions; the voltage signals outputted from the position sensors 262V and 262H are converted into digital signals, by A/D converters 264V and 264H, respectively, and read by the CPU 260. Accordingly, the pivotal operation of the trackball 262 is detected.

Based on the operation direction and operation amount (rotation amount) of the detected track ball 262, the CPU 260 moves within the imaging area the position of the AF area, to be transmitted as the AF-area information to the CPU 250 of the lens unit 210, i.e., the position of the AF area (AF frame), to be set in the AF processing unit 252 of the lens unit 210, in the up-and-down and left-and-right directions.

For instance, in the case where, viewed from a position opposing the trackball 262, the trackball 262 is pivotally operated leftward, the CPU 260 moves leftward within the imaging area the position of the AF area (AF frame) by the distance corresponding to the pivotal amount. Similarly, in the case where the trackball 262 is operated rightward, upward, or downward, the CPU 260 moves the position of the AF area by the distance corresponding to the pivotal amount, in the same direction as that of the operational direction. Accordingly, the position of the AF area is set or changed, in accordance with the operation of the trackball 262.

In addition, in the AF-area operation unit 230, a function is provided that obtains from the camera 212 the video signal for video picked up through the camera 212, synthesizes an AF-area image indicating the AF area that is set or changed as described above and the video signal as the picked-up video, and outputs to the viewfinder 214 the video signal for the synthesized video. As illustrated in FIG. 8, the function displays on the screen of the viewfinder 216 the picked-up video in the imaging area 290 and the AF frame 294 indicating the currently set AF area 292, whereby the cameraman can recognize the currently set AF area.

The AF-area operation unit 230 is equipped with a synthesis circuit 268 for synthesizing the video signal for the picked-up video inputted from the camera 212 and the image for the AF frame. The synthesis circuit 268 has three terminals A, B, and C; to the terminal A, the video signal output connector 212A (refer to FIG. 6) of the camera 212 is connected, and the video signal from the camera 212 is inputted; and to the terminal B, a voltage signal having a constant voltage value (the maximal level of the video signal (e.g., 2 V) is inputted. To the terminal C, the video signal input connector 214A (refer to FIG. 6) of the viewfinder 214 is connected.

Through a predetermined output switching signal forwarded from the CPU 260, the synthesis circuit 268 selects the terminal, to be connected to the terminal C, from the terminal A and the terminal B, and selects the signal, to be outputted from the terminal C, from the signal inputted from the terminal A and the signal inputted from the terminal B.

In each field interval of the video signal inputted from the terminal A of the synthesis circuit 268, the CPU 260 connects the terminal B to the terminal C, only during the interval corresponding to the pixels for displaying the AF-frame image, through the output switching signal forwarded to the synthesis circuit 268, and, during the rest of the field interval, connects the terminal A to the terminal C. Accordingly, the CPU 260 transmits to the lens unit 210 the AF-area information to synthesize the AF-frame image indicating the AF area and the video signal from the camera 212, and outputs the synthesized video signal from the terminal C of the synthesis circuit 268 to the viewfinder 214.

Figure 10A:
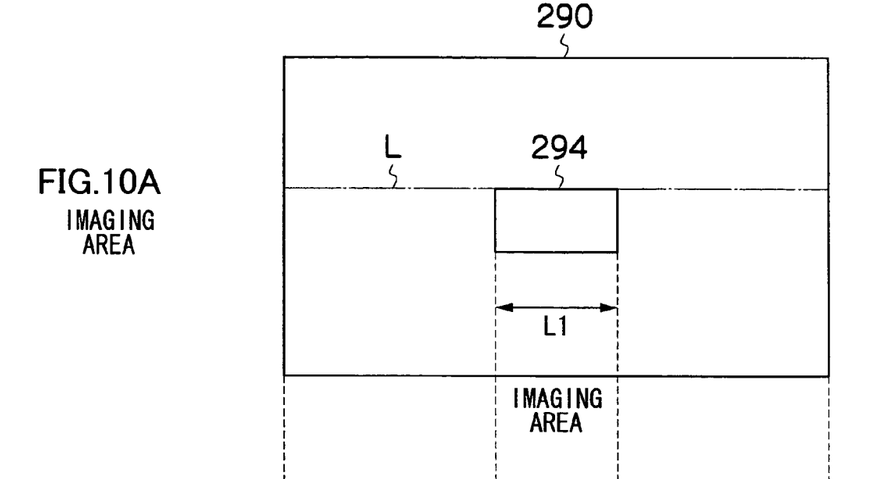
FIG. 10A is an explanatory view for explaining a synthesis circuit.
Figures 10B, 10C:
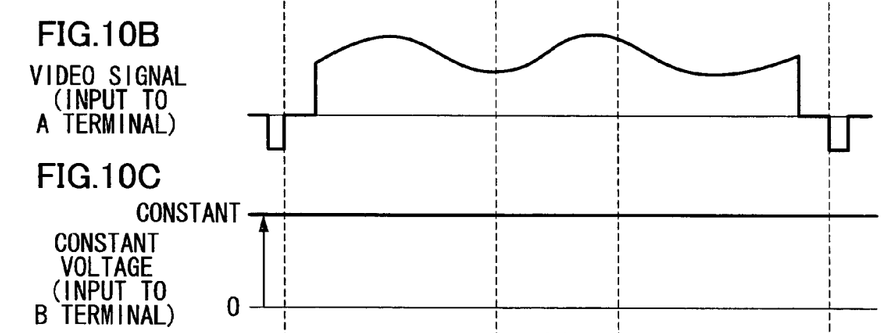
FIG. 10B is an explanatory view for explaining a synthesis circuit.
FIG. 10C is an explanatory view for explaining a synthesis circuit.
Figure 10D:
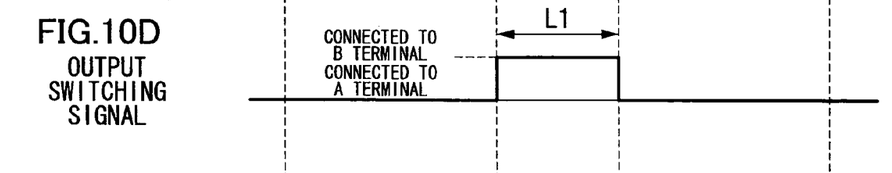
FIG. 10D is an explanatory view for explaining a synthesis circuit.
Figure 10E:
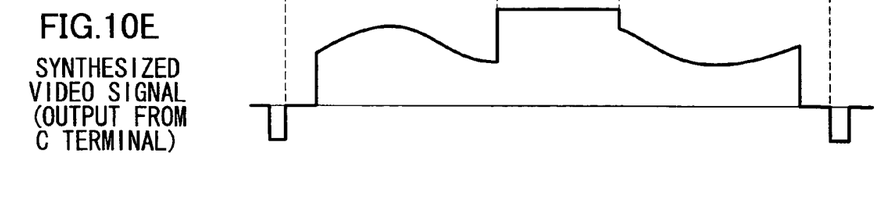
FIG. 10E is an explanatory view for explaining a synthesis circuit.

For example, in the case where, as illustrated in FIG. 10A, an image for the AF frame 294 and a video signal (picked-up video) from the camera 212 are synthesized in the imaging area 290, it is assumed that the video signal corresponding to a scanning line L, indicated by broken lines in FIG. 10A, passing through the top-side position of the AF frame 294 is forwarded as an video signal as illustrated in FIG. 10B from the camera 212 to the terminal A of the synthesis circuit 268, and that, as illustrated in FIG. 10C, a constant voltage signal is applied to the terminal B of the synthesis circuit 268. In this situation, only during an interval L1, in the scanning line L, corresponding to pixels that create the top side of the AF frame 294, the terminal C of the synthesis circuit 268 is connected to the terminal B, as illustrated in FIG. 10D, so that the constant voltage signal illustrated in FIG. 10C is outputted from the terminal C; during the rest of the interval corresponding to the scanning line L, the terminal C is connected to the terminal A so that the video signal illustrated in FIG. 10B is outputted from the terminal C. Accordingly, a video signal as illustrated in FIG. 10E is generated and outputted from the terminal C.

A video signal such as this, generated through the synthesis circuit 268, is outputted to the viewfinder 214, so that video picked up through the camera 212 and the image for an AF frame in accordance with the position, the size, and the shape of the currently set AF area are displayed on the screen of the view finder 214. Accordingly, the cameraman can implement changing operation related to the position of the AF area and the like, while recognizing the currently set AF area on the screen of the viewfinder 214.

In addition, the foregoing method, through the synthesis circuit 268, of synthesizing the image for an AF frame and picked-up video is an example; the synthesis of the image for an AF frame and picked-up video may be implemented with other methods.

As described above, in the foregoing embodiment, a case has been explained in which an image for the AF frame, as information indicating an AF area, is synthesized with picked-up video; however, the information indicating an AF area may be displayed by combining information other than an AF frame with picked-up video.

Moreover, in the foregoing embodiment, the video signal for video obtained by synthesizing through the AF-area operation unit 230 picked-up video and the image for an AF frame is outputted to a viewfinder mounted on the camera 212; however, the video signal may be outputted to a display (monitor) other than a viewfinder.

Still moreover, the present invention can be applied to an AF utilizing a method other than that in the foregoing embodiment.

Furthermore, to date, a tracking function has been proposed in which, in response to the movement of a target photographic subject on which a camera is focused, the AF area is automatically moved so that the position of the AF area automatically tracks the target photographic subject. For example, a method has been proposed in which an image for a target photographic subject is preliminarily registered, the image is detected, through pattern-matching processing, in picked-up video, and the AF area is moved to a position where the image has been detected. It is advantageous that, in the case where the AF-area operation unit 230 is equipped with the foregoing tracking function as one of the functions, the current AF area can be displayed being synthesized with picked-up video, through the present invention, while the automatic tracking is implemented.

What is claimed is:

1. An AF-area display apparatus integrated in a lens unit, comprising:
    an AF-area obtaining device that obtains an AF area currently set in an automatic focusing device;
    a video signal generating device that generates a video signal for displaying the AF area obtained through the AF-area obtaining device;
    a video signal outputting device that outputs the video signal generated by the video signal generating device; and
    a connected image processing apparatus, wherein
    the lens unit containing the AF-area display apparatus is interchangeably mounted on a camera and has the automatic focusing device for controlling focusing in such a way that the camera is focused on a photographic subject within the AF area in an imaging area of the camera, and
    the video signal for displaying the AF area, generated by the video signal generating device and a video signal for a picked-up image, outputted from the camera to a viewfinder are introduced to the image processing apparatus, and the image processing apparatus synthesizes the video signal for displaying the AF area and the video signal for the picked up image, superimposes an AF frame indicating the AF area on the picked-up image, and outputs the synthesized video signal to the viewfinder.

2. The AF-area display apparatus according to claim 1, wherein the video signal generating device generates a video signal for displaying video for a frame indicating an imaging area of the camera and for an AF frame indicating an AF area in the frame.

3. The AF-area display apparatus according to claim 1, further comprising a display device that displays video, based on a video signal outputted through the video signal outputting device.

4. The AF-area display apparatus according to claim 2, further comprising a display device that displays video, based on a video signal outputted through the video signal outputting device.

5. An AF-area operation apparatus that is utilized in an automatic focusing system for automatically implementing focusing adjustment of an optical system of a camera in such a way that the camera is focused on a photographic subject within a predetermined AF area in an imaging area of the camera, and that implements operation related to the AF area, comprising:
 a video signal obtaining device that obtains a video signal for picked-up video picked up through the camera;
 an AF-area information synthesizing device that generates a video signal for video obtained by synthesizing picked-up video as a video signal obtained through the video signal obtaining device and information on the AF area; and
 an outputting device that outputs a video signal generated by the AF-area information synthesizing device,
 wherein the AF-area operation apparatus is configured as a device separated from the camera, and
 the AF-area information synthesizing device generates a video signal for video obtained by synthesizing an image for an AF frame, as information on the AF area, indicating the outline of the AF area and the picked-up video, and
 the video signal for displaying the AF area, generated by the video signal generating device and a video signal for a picked-up image, outputted from the camera to a viewfinder are introduced to the image processing apparatus, and
 the synthesized video signal is outputted to the viewfinder.

6. An AF-area display apparatus, comprising:
 an AF-area obtaining device that obtains an AF area currently set in an automatic focusing device;
 a video signal generating device that generates a video signal for displaying the AF area obtained through the AF-area obtaining device;
 a video signal outputting device that outputs the video signal generated by the video signal generating device; and
 a connected image processing apparatus,
 wherein the AF-area display apparatus is connected as an auxiliary device to the lens unit, and
 the video signal for displaying the AF area, generated by the video signal generating device and a video signal for a picked-up image, outputted from the camera to a viewfinder are introduced to the image processing apparatus, and the image processing apparatus synthesizes the video signal for displaying the AF area and the video signal for the picked up image, superimposes an AF frame indicating the AF area on the picked-up image, and outputs the synthesized video signal to the viewfinder.

7. The AF-area display apparatus according to either claim 5 or 6, wherein the lens unit has an AF-area information outputting connector that outputs AF-area information indicating the AF area currently set in the automatic focusing device, the AF-area display apparatus is connected as an auxiliary device to the AF-area information outputting connector, and the AF-area obtaining device obtains AF-area information outputted from the AF-area information outputting connector, thereby obtaining the AF area.

8. The AF-area display apparatus according to claim 7, further comprising a display device that displays video, based on a video signal outputted through the video signal outputting device.

9. The AF-area display apparatus according to claim 6, wherein
 the AF-area display apparatus is connected to a connector of the lens unit and a connector of the camera, and transfers signals from a sender to a receiver, the signals being sent and received between the lens unit and the camera.

10. The AF-area display apparatus according to claim 9, wherein
 the AF-area display apparatus transfers an iris signal from the camera to the lens unit.

11. The AF-area display apparatus according to claim 9, wherein
 the AF-area display apparatus transmits information of a lens from the lens unit to the camera.

* * * * *